United States Patent [19]

Roberts

[11] 4,063,096
[45] Dec. 13, 1977

[54] SELF-PROTECTING INFRARED DETECTOR WITH A CONTINUOUSLY VARIABLE ATTENUATOR

[75] Inventor: Thomas G. Roberts, Huntsville, Ala.

[73] Assignee: The United States of America as represented by the Secretary of the Army, Washington, D.C.

[21] Appl. No.: 756,229

[22] Filed: Jan. 3, 1977

[51] Int. Cl.² .............................................. G01J 1/42
[52] U.S. Cl. ................................... 250/343; 250/339; 250/342; 350/267
[58] Field of Search .............. 250/338, 339, 340, 342, 250/343, 344, 346; 350/17, 267, 312

[56] References Cited

U.S. PATENT DOCUMENTS

| | | | |
|---|---|---|---|
| 3,659,452 | 5/1972 | Atwood et al. | 250/343 X |
| 3,788,729 | 1/1974 | Lowell et al. | 350/267 X |
| 4,019,056 | 4/1977 | Block et al. | 250/344 |

Primary Examiner—Archie R. Borchelt
Attorney, Agent, or Firm—Nathan Edelberg; Robert P. Gibson; Harold W. Hilton

[57] ABSTRACT

An instrument for protecting sensitive infrared detectors, such as those used in satellites, from being damaged by exposure to high intensity radiation. The high intensity radiation may come from a high power cw laser. A gas absorption cell is used between the detector and the collecting optics to limit the amount of radiation reaching the detector. However, if it is desirable to also protect the collecting optics, then the gas absorption cell may be used in front of the collecting optics. In either case, the pressure in the absorption cell is controlled by the output reading of the detector; in that, when the rate of increase of the intensity is less than a predetermined value and the intensity is less than 90% of its saturation value then there is no gas in the absorption cell and the detector operates normally. However, when the intensity exceeds 90% of its saturation value the attenuator is actuated until the signal is decreased to say 1/10th of its saturation value at which time the attenuator is deactivated. The intensity reaching the instrument is determined from measurements of the detector output and the pressure in the attenuator. In this manner the dynamic range of the detector can be increased by several orders of magnitude. There is also a fast acting puff valve so that, when dI/dt exceeds a certain value, the attenuator can be quickly filled with the gas mixture to protect the detector from burn out. These detectors operate in certain wavelength bands like 3 to 5 μm, 8 to 14 μm, or 16 to 22 μm and the gas used in the absorption cell is different for each detector as explained below.

8 Claims, 3 Drawing Figures

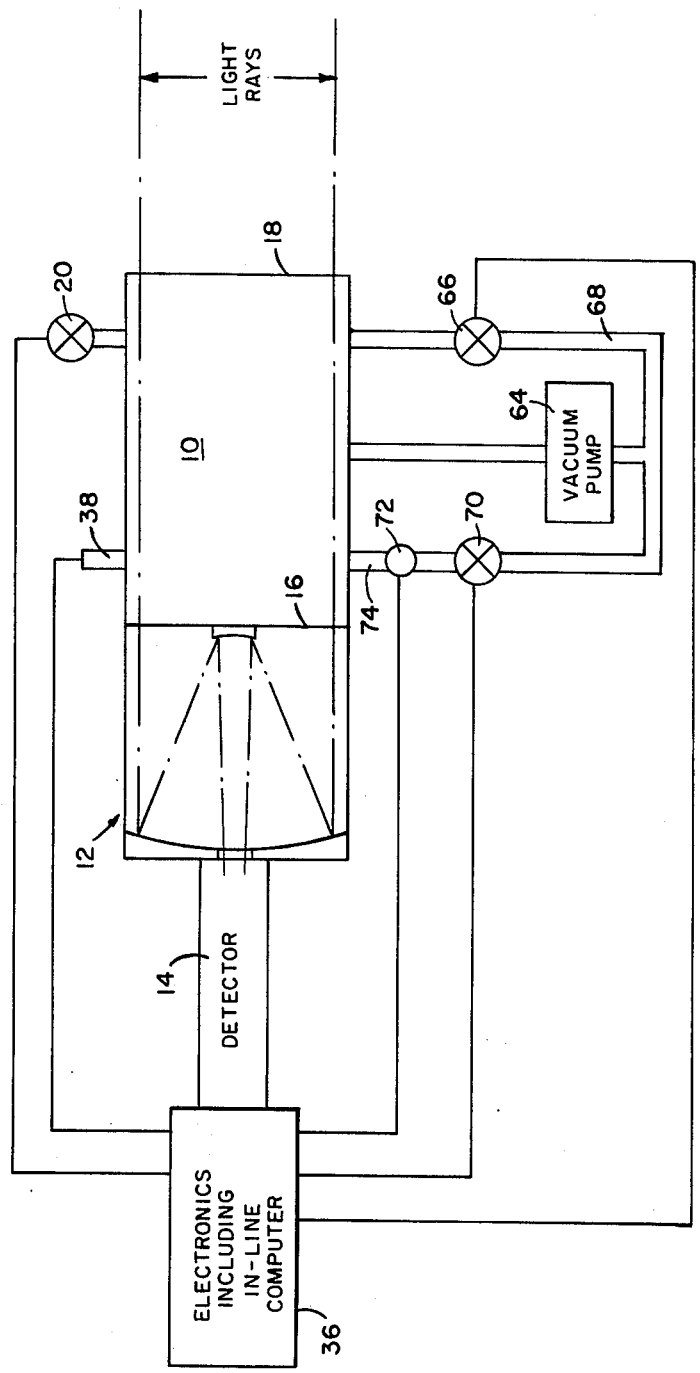

SELF-PROTECTING INFRARED DETECTOR WITH A CONTINUOUSLY VARIABLE ATTENUATOR

BACKGROUND OF THE DISCLOSURE

Sensitive infrared dectectors are now used on satellites to detect the thermal radiation from objects under observation. These instruments are designed for the detection of very low levels of radiation intensities and usually are cryogenically cooled. Therefore, they saturate at rather low radiation levels and cannot be used to observe the earth's limb, or in directions near the sun. Also, because of the fairly large collecting optics, which also have to be cryogenically cooled, these detectors are vulnerable to high intensity radiation from existing high energy lasers. In this case some protection can be obtained by cutting off the electronics whenever the rate of increase in intensity exceeds a certain value. But, it is difficult to determine when it is safe to again turn on the electronics, and the detector may also be damaged beyond recovery even when the electronics are turned off, if the radiation intensity is large enough. These detectors operate in certain wavelength bands like 3 to 5 $\mu$m, 8 to 14 $\mu$m or 16 to 22 $\mu$m, and filters are used to prevent radiation at other frequencies from reaching the detector surfaces.

The instrument disclosed here uses a gas absorption cell in which the attenuation to wavelengths of interest is controlled by the output of the detector itself. In this manner the dynamic range of the detector can be extended many orders of magnitude, thus, allowing the detector to be used to determine where the high intensity radiation is coming from and also to measure the intensity of the radiation reaching the collecting optics. The continuously variable attenuator may be utilized either in front of or behind the collecting optics. In either case the cell will have to be cryogenically cooled and the normal filters may be used as end windows for the cell. However, if the cell is used behind the collecting optics then the cell can be made quite small. The intensity reaching the instrument is calculated by an on-line computer from the measurements of the pressure in the absorption cell and the intensity reaching the detector by use of Beard's law; $I = I_o e^{-\alpha p}$. Where I is the intensity reaching the detector, $p$ is the pressure in the absorption cell and $\alpha$ is absorption coefficient of the gas used in the attenuator. Normally $\alpha$ is a constant, but in some cases, like the use of $SF_6$ near 10.6 $\mu$m, $\alpha$ is a function of both I and $p$, [$\alpha = \alpha$ (I,P)], and would also have to be calculated by the computer.

SUMMARY OF THE INVENTION

The object of this invention is to provide a sensitive infrared detector with a built-in self-protecting mechanism for high intensity radiation at certain wavelengths. A further objective of this invention is to provide the detector with a self-controlled continuously variable optical attenuator which greatly increases the dynamic range of the instrument at the wavelengths of interest. This device consists of an infrared detector with its associated electronics, collecting optics, and a continuously variable optical attenuator. These elements are arranged so that the amount of attenuation is controlled by the output of the detector and the intensity of the radiation reaching the instrument is calculated by an on-line computer from the output reading of the detector and a measurement of the pressure in the continuously variable optical attenuator.

BRIEF DESCRIPTION OF THE DRAWINGS

FIG. 3 is a diagrammatic view illustrating an optical attenuator located in front of the collecting optics and having a closed cycle gas supply system.

DETAILED DESCRIPTION OF THE INVENTION

Figure 1:
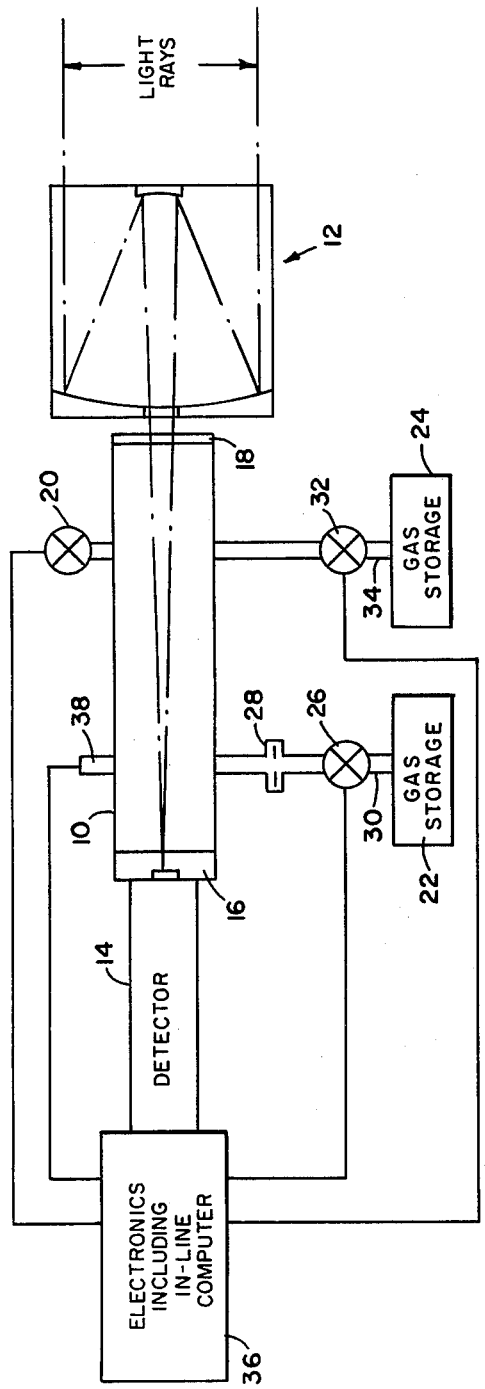
FIG. 1 is a diagrammatic view of an infrared detector with a continuously variable optical attenuator.

Referring to FIG. 1, a continuously variable optical attenuator 10 is shown located between collecting optics (telescope 12), and the infrared detector's sensing element 14. The end windows 16 and 18 of the attenuator may be made from the bandwidth limiting filters normally used with these detectors or the filter can be used in the collecting optics as usual, in which case the end windows of the attenuator would be made from materials transparent in the infrared. An exit valve 20 is in communication with the interior of attenuator 10 and the atmosphere. A pair of gas storage containers 22 and 24 are disposed in communication with the optical attenuator at opposite ends thereof. A solenoid valve 26 and a sonic orifice 28 are disposed in line 30 connecting container 22 to attenuator 10. A fast acting puff valve 32 is disposed in line 34 connecting container 24 with attenuator 10. An electronics package 36, including an in-line computer, is electrically connected to valves 26 and 32, and to exit valve 20 and to a pressure gauge 38 secured in the attenuator 10.

In normal operation the exit valve 20 is opened to the satellite's environment while the other valves 26 and 32 are closed. This allows the instrument to be used at its maximum sensitivity. However, when the output of detector 14 approaches its saturation value, say at $I = 0.9\ I_{sat}$, or when the rate of increase of the intensity exceeds a predetermined value then exit valve 20 is closed and solenoid valve 26 is opened. The pressure in gas storage vessel 22 behind the solenoid valve 26 is such that the mass flow rate, in, through sonic orifice 28 is constant. Thus, solenoid valve 26 may be left opened until the radiation reaching detector 14 is reduced, say to $I = 0.1\ I_{sat}$. At which time solenoid valve 26 is closed. The instrument may now be used to determine where the source of high intensity radiation is located, or to measure the intensity of the radiation that reaches the instrument. The radiation level is determined from the intensity, I, which reaches detector 14 and from the pressure, P, in attenuator 10 as measured by the pressure gauge 38. The intensity $I_o$ reaching the instrument is given by $I_o = I\ e^{\alpha P}$ where $\alpha$ is the absorption coefficient of the gas used in attenuator 10. For a detector operating in the 8 to 14 $\mu$m, wavelength range where the damaging radiation would be a wavelength near 10.6 $\mu$m, gas storage cell 10 is filled with a gas like 1,1-difluoroethylene, dichlorodifluoromethane, perfluoro-2-butene, octofluorocyclobutane, chloropentafluoroethane, 1,2-dichlorotetrafluoroethane, 1,1-difluoro-1-chloroethane, 1,1-difluoroethane, 3-methyl-1-butene, ethylene, propylene, dimethyl ether, propane, or sulfurhexafluoride. Other gases may be used, but these have been found to be the most attenuating at 10.6 $\mu$m. The absorption coefficient of these gases is a constant except for $SF_6$ where $\alpha$ is a function of the intensity and the pressure. In this case the on-line computer also calculates α from the measured values. For detectors operating in the other wavelength ranges of interest, like the 3 to 5 μm band, different gases would be used in the gas storage cells. If the intensity again rises to a value near its saturation level the above process can be repeated by again opening solenoid valve 26. This process may be repeated several times depending on the pressure in the gas storage cell and on the manner in which the attenuator is constructed. In the event that the high intensity radiation is removed or is turned off; the above process is reversed by opening exit valve 20, thus reducing the attenuation, until intensity reading is raised to say 0.6 $I_{sat}$ or until the attenuator is completely evacuated. If the intensity increases so fast that the continuously variable attenuation operation cannot handle it, then the fast acting puff valve 32 is actuated so that the attenuator is filled to a high pressure on a very short time scale of the order of microseconds. If this does not reduce the intensity at the detector then the electronics are also turned off.

The puff valve may be similar to that disclosed in U.S. Pat. No. 3,361,045 or to that disclosed in *The Review of Scientific Instruments*, Vol. 31, Number 2, pages 146–148 entitled "Magnetically Driven Fast-Acting Valve for Gas Injection into High Vacua."

Figure 2:
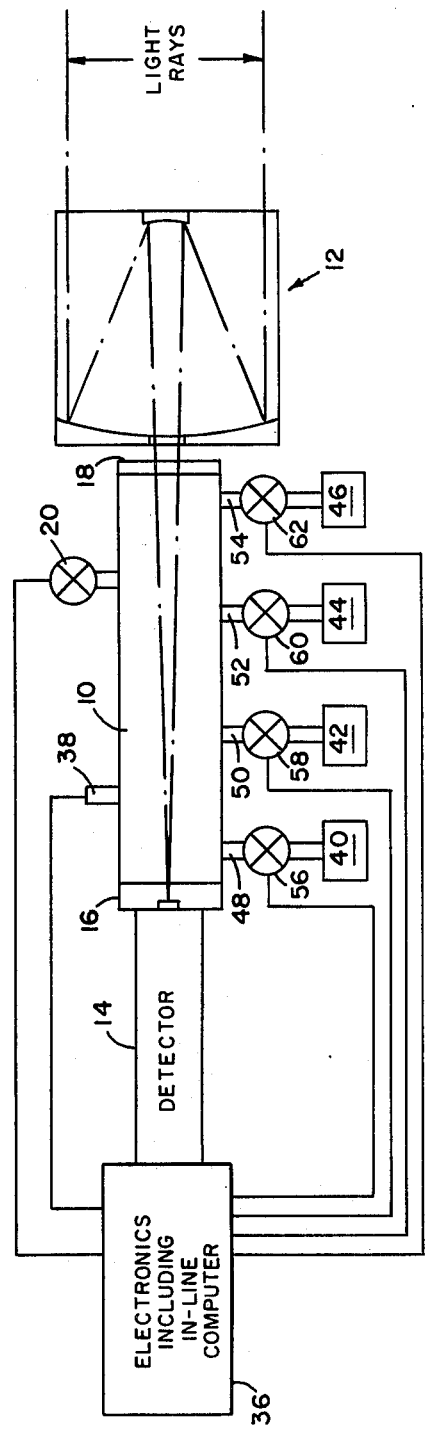
FIG. 2 is a diagrammatic view of an infrared detector with an optical attenuator which is variable by decades.

Referring now to FIG. 2 wherein like numerals refer to like parts, in this configuration no sonic orifices are used. In this embodiment a plurality of gas storage containers 40, 42, 44 and 46 are connected through lines 48, 50, 52 and 54, respectively, to attenuator 10. Disposed in these lines, respectively, are solenoid valves 56, 58, 60 and 62 all of which are electrically connected to the electronics package 36.

Each gas storage cell contains enough gas to cause the radiation to be attenuated by a factor of 10. For example, the first time the intensity saturates, the valve 56 to storage container 40 is opened, and the attenuator is rapidly filled to a pressure (a few torr) where the intensity I reaching the detector is 1/10 that reaching the instrument at saturation. If the intensity again saturates, then the valve 58 to storage container 42 is opened and the pressure in the attenuator is increased by an amount of 2.3/α so that the intensity reaching the detector is now attenuated by a factor of 100. When the valve 60 to storage container 44 is opened, the radiation is attenuated by a factor of 1000, etc. As many storage cells per set may be used as is desired and several sets may also be employed (not shown in the drawing). When, the radiation begins to decrease sufficiently then the exit valve can be used as in the manner described for FIG. 1.

Referring now to FIG. 3 wherein like numerals refer to like parts. However, in this embodiment attenuator 10 is disposed in front of the collecting optics 12 to protect the optical surface of the telescope.

As shown in FIG. 3, detector 14 is disposed aft of the collecting optics and a vacuum pump 64 is connected to attenuator 10. A fast acting puff valve 66 is connected in line 68 between attenuator10 and the vacuum pump. A solenoid valve 70 and a sonic valve 72 (needle valve) is in line 74 between attenuator 10 and the vacuum pump. Puff valve 66, solenoid valve 70 and sonic valve 72 are electrically connected to the electronic package 36. The pressure in attenuator 10 is controlled by a balancing of the flow rate through variable sonic orifice 72 and the pumping speed of vacuum pump 64 which is a function of the pressure. In this case exit valve 20 is used only in case the vacuum pump were to fail. The advantage here is the closed cycle gas supply system so that the life time of the attenuator is not limited by the amount of gas on hand.

I claim:

1. In an infrared detection system having an infrared detector and collecting optics, protection means for protecting said detector from high intensity radiation comprising:
   a. a gas absorption cell disposed forwardly of said detector to limit the amount of radiation reaching said detector;
   b. gas storage means connected to said absorption cell to supply gas thereto;
   c. control means for controlling flow of gas to said cell in proportion to the intensity of radiation reaching said cell.

2. Apparatus as in claim 1 wherein said control means includes:
   a. output means for producing a signal indicative of radiation intensity and pressure in said cell;
   b. means for regulating the mass flow rate of gas to said cell; and,
   c. actuating means disposed for receiving said signal from said output means and for actuating said regulating means responsive to receiving said signal.

3. Apparatus as in claim 2 wherein said regulating means includes solenoid valve means connected between said gas storage means and said cell.

4. Apparatus as in claim 3 wherein said actuating means is an in-line computer.

5. Apparatus as in claim 4 including a puff valve connected between said gas storage means and said cell, said valve disposed for actuation responsive to rapid increase of radiation in said cell, whereby said cell is filled to a high pressure instantaneously.

6. Apparatus as in claim 4 wherein said gas storage means includes a plurality of gas storage containers connected to said cell; and, a solenoid valve connected intermediate said cell and each said gas storage containers, said actuating means disposed for sequential operation of said valves whereby the gas flow to said cell is controlled in proportion to the amount of radiation reaching said cell.

7. Apparatus as in claim 4 including a needle valve disposed between said solenoid valve and said cell for controlling gas flow rate to said cell.

8. Apparatus as in claim 7 including a vacuum pump connected to said cell and said needle valve for the pressure in the cell is controlled by balancing of the flow rate through the needle valve and pumping speed of the vacuum pump.

* * * * *